G. DALÉN.
DEVICE FOR LIGHTING AND EXTINGUISHING GAS FLAMES FROM A DISTANT POINT.
APPLICATION FILED JUNE 29, 1907.
1,041,038. Patented Oct. 15, 1912.
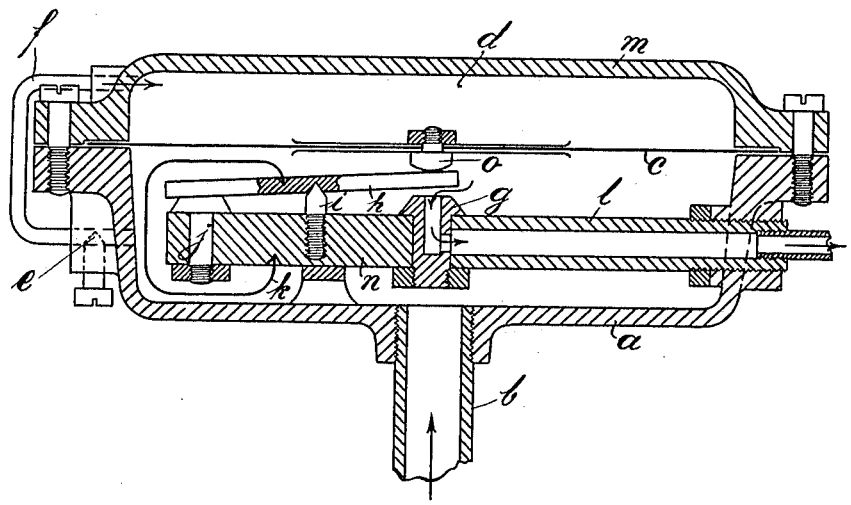

UNITED STATES PATENT OFFICE.

GUSTAF DALÉN, OF STOCKHOLM, SWEDEN, ASSIGNOR TO AKTIEBOLAGET GASACCU-MULATOR, OF STOCKHOLM, SWEDEN.

DEVICE FOR LIGHTING AND EXTINGUISHING GAS-FLAMES FROM A DISTANT POINT.

1,041,038. Specification of Letters Patent. Patented Oct. 15, 1912.

Application filed June 29, 1907. Serial No. 381,490.

*To all whom it may concern:*

Be it known that I, GUSTAF DALÉN, engineer, citizen of Sweden, residing at Stockholm, Sweden, have invented new and useful Improvements in Devices for Lighting and Extinguishing Gas-Flames from a Distant Point, of which the following is a specification.

This invention has for its object to provide improved apparatus for lighting and extinguishing gas flames from a distant point by raising and lowering the gas pressure in the well known manner by loading and unloading the gas holder at the gas works, and is characterized in that the action of the apparatus is independent of the amount of the gas pressure and of common variations of the gas pressure which are relatively slowly transmitted, and is dependent upon sudden variations of pressure, such as are established as just mentioned at the gas works by intentional variations of the load of the gas holder for lighting or extinguishing the gas lights.

The accompanying drawing shows in section and as an example a constructional form of apparatus embodying this invention.

$c$ indicates a diaphragm inserted between flanges of casings $a$ and $d$, so that said casings constitute chambers which are kept gas tight and are divided from one another by the diaphragm $c$.

$b$ indicates a pipe supplying gas to the chamber $a$ and $l$ a pipe leading to the burner (not shown) of the light it is desired to control, the pipe $l$ being connected with the chamber $a$ through the valve seat $g$.

$h$ indicates a plate which serves as a valve and which is movable on one or more points $i$ that is or are screwed into a piece $n$ which is firmly connected with the chamber $a$ and which, in the constructional form shown, also carries the valve seat $g$ and constitutes the pipe $l$.

A spring $k$ is inserted between the piece $n$ or the chamber $a$ and the plate $h$ in such a manner as to tend to hold the valve open, one end of the plate being pressed against a shoulder $j$ on the piece $n$ whereas its other or valve end is pressed against a shoulder $o$ on the diaphragm $c$. The strength of the spring $k$ counterbalances the weight of the diaphragm $c$ and its shoulder $o$.

The valve plate $h$ or its valve seat $g$ is subjected to magnetic action. For this purpose the plate may be so constructed that it constitutes a magnet, and the shoulder $j$ and also the valve seat $g$ may be made of magnetic material. Or vice versa the parts $j$ and $g$ may be magnetized and the plate be made of magnetic material. The power of the magnetism between the plate $h$ and the valve seat $g$ or the shoulder $j$ should be less than the strength of the spring $k$.

A pipe $f$ admits communication between the chambers $a$ and $d$, the cross sectional area of the pipe $f$ being capable of adjustment to the desired extent by means of a screw $e$ extending through the pipe wall for the purpose of controlling the flow of gas from the one chamber to the other as desired, or the pipe may be filled wholly or partly with a suitable porous material, for example, asbestos, cotton, sand or the like, or such controlling means may be used in connection one with the other.

It is essential that the passage between the chambers $a$ and $d$ be such that a variation of pressure in the one chamber is gradually transmitted to the other chamber, and so that a sudden variation of pressure in the one chamber is not immediately perceptible in the other chamber.

The apparatus works in the following manner. Provided the valve $g$ is closed and the shoulder $o$ of the diaphragm is abutting toward the plate $h$, and gas under pressure be conducted through the conduit $b$ into the chamber $a$, the diaphragm $c$ will be pushed upward to the position shown on the drawing. The spring $k$ will overcome the magnetism between the plate $h$ and the valve seat $g$, and therefore open the valve, so that the parts assume the position shown on the drawing, in which position the plate $h$ is held by the magnetic attraction between the plate $h$ and the shoulder $j$. The gas thus flows through the conduit $b$ from the mains connected with the gas works, to the chamber $a$ and from this latter through the valve $g$ and pipe $l$ to the burner, and as the burner is provided with a pilot lighting jet the gas flame is lighted as soon as gas is allowed to flow through the valve $g$.

The gas pressure prevailing in the chamber $a$ is transmitted through the pipe $f$ to the chamber $d$, so that the same pressure prevails on both sides of the diaphragm which does not therefore change its position. If the gas pressure in the conduit $b$ and thus also in the chamber $a$ changes owing to variations of the gas consumption, for example in the gas mains to which the conduit $b$ is connected, such variations of pressure which are relatively small and take place relatively slowly will not be transmitted to the chamber $d$ suddenly but only gradually. At such slow variations of pressure the diaphragm will therefore remain at rest, but if it be required to extinguish the gas flame in question and, for this purpose, the pressure in the main is suddenly diminished, for example, by suddenly diminishing the load of the gas holder at the gas works as above mentioned, the pressure in the chamber $a$ will be suddenly diminished, and as this diminution of pressure is only gradually transmitted through the pipe $f$ to the chamber $d$, a difference of pressure prevails during a certain period of time on the two sides of the diaphragm $c$ owing to which such diaphragm moves downwardly against the action of the spring $k$ as soon as the magnetic action between the plate $h$ and the shoulder $j$ is overcome by said difference of pressure and moves the valve plate $h$ out of the position shown on the drawing to a position in which it closes the valve $g$ and shuts off the gas supply through the pipe $l$ to the burner thereby extinguishing the flame.

The pressure is gradually transmitted from the chamber $d$ to the chamber $a$ so that the same pressure will finally prevail on both sides of the diaphragm, which will thus keep the position occupied by the same and which is that supposed at the beginning of the working of the apparatus above described. Said position is also kept at such variations of the pressure in the conduit $b$, which take place relatively slowly.

The valve-plate $h$ will thus be held until the attraction is overcome by the pressure in the compartment $d$ or by the spring $k$, when the diaphragm is removed from the valve plate by the pressure in the compartment $a$; when the valve plate $h$ is suddenly moved to its other end position it is again held in position by magnetic action.

I claim as my invention:—

1. A device for lighting and extinguishing a gas flame from a distant point, comprising a casing, a diaphragm therein dividing the casing into two compartments, a gas supply pipe entering one of said compartments, a valve for controlling the flow of gas from the gas supply pipe to the burner, means additional to the diaphragm for opening and closing the valve when a difference of pressure is prevailing between the compartments, and means for gradually transmitting the gas pressure from one compartment to the other, the latter means being independent from the supply pipe to the burner.

2. In a device of the class described a casing, a diaphragm dividing the casing into two compartments, a gas inlet to one of said compartments and a gas outlet therefrom, a magnetically actuated valve controlling the gas outlet, said valve being closed by the diaphragm, a spring tending to open the valve, and means for gradually transmitting the gas pressure from one compartment to the other.

3. In a device of the class described, a casing, a diaphragm dividing the casing into two compartments, a gas supply pipe entering one of said compartments, a gas outlet pipe leading from said compartment, a magnetically actuated valve controlling said gas outlet pipe and adapted to be closed by the diaphragm, a spring tending to open said valve, and adjustable means for gradually transmitting the gas pressure from one compartment to the other.

4. In a device of the class described, a casing, a diaphragm dividing the same into two compartments, a gas supply pipe leading to one of said compartments, a gas outlet pipe leading from said compartment, a magnetic valve plate for controlling the gas outlet pipe, said plate being supported intermediate its ends, a spring engaging with one end of said plate and tending to hold the valve open, a part of the diaphragm engaging with the plate to close the same, a pipe connecting the compartments together, and means in said pipe regulating the gradual transmission of gas pressure from one compartment to the other.

5. In a device of the class described, a casing, a diaphragm dividing the casing into two compartments, a gas supply pipe leading to one of said compartments, a gas outlet pipe leading from said compartment, a valve seat of magnetic material in communication with said outlet pipe, a magnetic valve plate supported intermediate its ends, a stud of magnetic material adapted to engage with the free end of said plate, a spring tending to hold the valve open, a part on the diaphragm adapted to engage with the valve plate to close the same, and means for gradually transmitting the gas pressure from one compartment to the other.

6. In a device for lighting and extinguishing a gas flame from a distant point, a diaphragm, actuated by the gas pressure, means for delivering the gas on one side of the diaphragm and means for gradually transmitting the gas pressure from the delivery side of the diaphragm to the other.

7. In a device for lighting and extinguishing a gas flame from a distant point, a diaphragm, actuated by the gas pressure, and a magnetically actuated valve controlling the flow of gas to the flame and initially actuated by the diaphragm.

8. A device for lighting and extinguishing a gas flame from a distant point, comprising a casing, a diaphragm therein dividing the casing into two compartments, a gas supply pipe entering one of said compartments, a gas outlet pipe from said compartment, a valve for controlling the flow of gas from one of the compartments, means additional to the diaphragm for opening and closing the valve when a difference of pressure is prevailing between the compartments, and means for gradually transmitting the gas pressure from one compartment to the other.

In testimony whereof I have signed my name to this specification in the presence of two subscribing witnesses.

GUSTAF DALÉN.

Witnesses:
 WALDEMAR BOMAN,
 T. EKEBOHM.

Copies of this patent may be obtained for five cents each, by addressing the "Commissioner of Patents, Washington, D. C."